(12) United States Patent
Chen et al.

(10) Patent No.: US 12,732,503 B2
(45) Date of Patent: Sep. 8, 2026

(54) METHODS AND DEVICES FOR CONTROLLING A SMART DEVICE

(71) Applicant: SHANGHAI ZHANGMEN SCIENCE AND TECHNOLOGY CO., LTD., Shanghai (CN)

(72) Inventors: Danian Chen, Shanghai (CN); Peixi Wu, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/106,198

(22) Filed: Nov. 30, 2020

(65) Prior Publication Data

US 2021/0084046 A1 Mar. 18, 2021

Related U.S. Application Data

(63) Continuation of application No. PCT/CN2019/089762, filed on Jun. 3, 2019.

(30) Foreign Application Priority Data

Jun. 1, 2018 (CN) ......................... 201810557467.4

(51) Int. Cl.
*H04L 29/06* (2006.01)
*H04L 9/40* (2022.01)
(Continued)

(52) U.S. Cl.
CPC .......... *H04L 63/102* (2013.01); *H04L 63/101* (2013.01); *H04L 63/104* (2013.01);
(Continued)

(58) Field of Classification Search
CPC ... H04L 63/102; H04L 63/101; H04L 63/104; H04L 63/20; H04L 12/282; H04W 12/37;
(Continued)

(56) References Cited

U.S. PATENT DOCUMENTS 9,451,388 B1 * 9/2016 Lung ....................... H04W 4/38
2006/0117010 A1 6/2006 Hakala
(Continued)

FOREIGN PATENT DOCUMENTS

CN 1968101 A 5/2007
CN 104091131 A 10/2014
(Continued)

*Primary Examiner* — Baotran N To
(74) *Attorney, Agent, or Firm* — Finnegan, Henderson, Farabow, Garrett & Dunner, LLP

(57) ABSTRACT

The present application provides a method for controlling a smart device, in which a management device provides a user equipment with information on currently-controllable smart devices. Thus a user can learn actual situation of the currently-controllable smart devices through the user equipment so as to determine a target smart device and send an authorization request for the target smart device through the user equipment. Then the management device determines a control authority of the target smart device for the user equipment according to request parameters in the authorization request and provides customized allocation of a corresponding control authority of the target smart device to each user equipment, so that the user equipment can control the target smart device under the control authority. Thus control authorities for different user equipments is controlled flexibly, while an excessively broad control authority for a specific user equipment which affects security is avoided.

12 Claims, 3 Drawing Sheets

(51) Int. Cl.
*H04W 12/37* (2021.01)
*H04W 12/69* (2021.01)

(52) U.S. Cl.
CPC ............ *H04L 63/20* (2013.01); *H04W 12/37* (2021.01); *H04W 12/69* (2021.01)

(58) Field of Classification Search
CPC .......................... H04W 12/69; H04W 12/084; H04M 1/72415
See application file for complete search history.

(56) References Cited

U.S. PATENT DOCUMENTS

2018/0046465 A1* 2/2018 Jacoby ................ H04L 12/2818
2018/0176224 A1* 6/2018 Cho ........................ H04W 4/70
2018/0183788 A1* 6/2018 Kim .................... H04L 63/0853
2018/0288209 A1* 10/2018 Kim .................... H04L 63/0853

FOREIGN PATENT DOCUMENTS

| | | | |
|---|---|---|---|
| CN | 104283745 | A | 1/2015 |
| CN | 104865836 | A | 8/2015 |
| CN | 104902024 | A | 9/2015 |
| CN | 105072250 | A | 11/2015 |
| CN | 105223913 | A | 1/2016 |
| CN | 105471974 | A | 4/2016 |
| CN | 105743841 | A | 7/2016 |
| CN | 105933188 | A | 9/2016 |
| CN | 106330636 | A | 1/2017 |
| CN | 108809775 | A | 11/2018 |

* cited by examiner

METHODS AND DEVICES FOR CONTROLLING A SMART DEVICE

CROSS REFERENCE TO THE RELATED APPLICATION

This application is the continuation application of International Application No. PCT/CN2019/089762, filed on Jun. 3, 2019, which is based upon and claims priority to Chinese Patent Application No. 201810557467.4, filed on Jun. 1, 2018, the entire contents of which are incorporated herein by reference.

TECHNICAL FIELD

The present application relates to a field of information technology, and more specifically relates to a method and a device for controlling a smart device.

BACKGROUND

With continued development of Internet of Things technology, various smart devices are increasingly used in various aspects of people's lives. For example, various smart home devices such as set-top boxes, smart sounds, smart TVs, and air conditioners, etc., and even unmanned smart cars can provide people with much convenience in their lives in various fields. When these smart devices are used, use authorities to the smart devices may be granted to user equipments such as mobile phones, tablets, etc., so that users may operate the smart devices with the user equipments. However, when a use scenario becomes more and more complicated, or as a number of user equipments that are controlling and a number of smart devices that are controllable in the scenario increase, there are drawbacks, such as inflexibility and insecurity, in existing methods for controlling smart devices.

SUMMARY

One of objectives of the present application is to provide a solution for controlling a smart device.

In order to achieve the above-mentioned objective, some embodiments of the present application provide a method, implemented at a management device, for controlling a smart device. The method comprises:

providing a user equipment with information on currently-controllable smart devices, so that the user equipment transmits an authorization request for a target smart device based on the information on the currently-controllable smart devices;

obtaining the authorization request for the target smart device from the user equipment;

determining a control authority of the target smart device for the user equipment according to request parameters in the authorization request; and allocating control authority of the target smart device to the user equipment, so that the user equipment controls the target smart device within the control authority.

Further, the embodiments of the present application also provide a method, implemented at a user equipment, for controlling a smart device. The method comprises:

obtaining information on currently-controllable smart devices provided by a management device;

transmitting an authorization request for a target smart device to the management device based on the information on the currently-controllable smart devices, so that the management device allocates control authority of the target smart device to the user equipment according to the authorization request; and controlling the target smart device within the control authority.

In addition, the embodiments of the present application also provide a device for controlling a smart device. The device comprises a memory for storing computer program instructions and a processor for executing computer program instructions, wherein the computer program instructions, when executed by the processor, trigger the device to perform the above-mentioned method for controlling a smart device.

Moreover, a computer-readable medium having computer program instructions stored thereon is provided. The computer-readable instructions being executable by a processor to implement the above-mentioned method for controlling a smart device.

In the solutions provided by some embodiments of the present application, the management device provides a user equipment with information on currently-controllable smart devices, so that a user can learn actual situation of the currently-controllable smart devices through the user equipment to determine a target smart device, and sends an authorization request for the target smart device through the user equipment. Then the management device determines a control authority of the target smart device for the user equipment according to request parameters in the authorization request, so as to provide customized allocation of a corresponding control authority of the target smart device to each user equipment, so that the user equipment can control the target smart device under the control authority. Thus control authorities for different user equipments is controlled flexibly, while an excessively broad control authority for a specific user equipment which affects security is avoided.

DESCRIPTIONS OF THE DRAWINGS

Other features, objects, and advantages of the present application will become more apparent by reading the detailed description of non-limiting embodiments with reference to the following drawings.

The identical or similar reference numerals in the drawings represent the identical or similar components.

DETAILED EMBODIMENTS

To explain objects, technical solutions, and advantages of embodiments of the present application more clearly, the technical solutions in the embodiments of the present application will be described clearly and fully with reference to the accompanying drawings in the embodiments of the present application below. Obviously, the described embodiments are parts of the embodiments, but not all of the embodiments of the present application. Based on the embodiments in the present application, all other embodiments obtained by any person of ordinary skills in the art without paying creative labor fall within the protection scope of the present application.

In a typical configuration of the present application, a terminal and a device of a service network both comprise one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission medium, which can be used to store information that can be accessed by a computing device.

Figure 1:
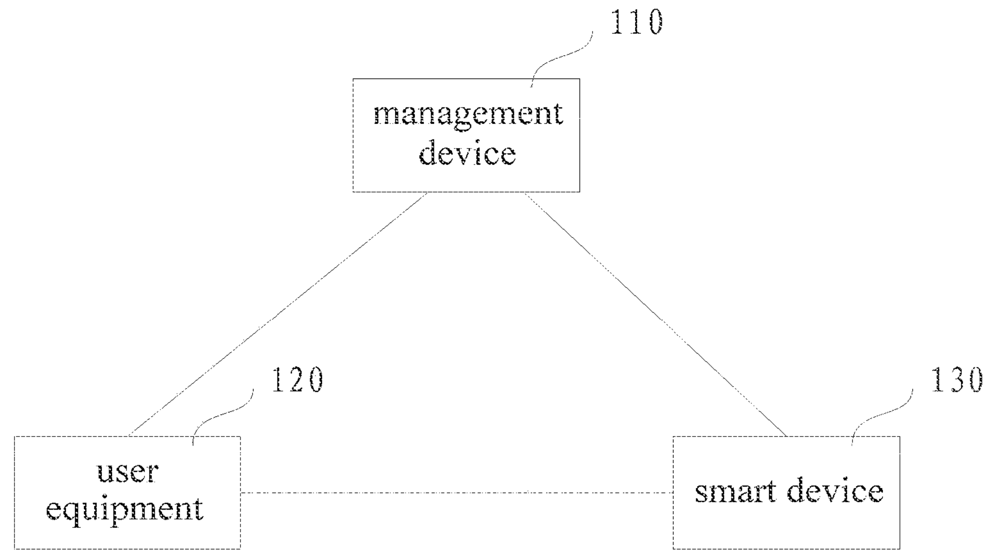
FIG. 1 is a topology diagram of a solution for controlling a smart device provided by embodiments of the present application.

FIG. 1 shows a topology of a solution for controlling a smart device provided by embodiments of the present application. The topology comprises a user equipment 120, a management device 110 and a smart device 130. The user equipment 120 is a device which is operated by a user to control the smart device. The user equipment 120 is used to issue control instructions to the smart device, so as to control the smart device to implement corresponding operations. The user equipment 120 may be various types of terminal devices such as computers, mobile phones, tablets, etc. The smart device 130 is a controlled device in this solution. The smart device 130 may be a device with various types of functions, which can implement various functions under the control of the user equipment. The smart device 130 may be, for example, various types of smart home devices such as set-top boxes, smart sounds, smart TVs, air conditioners, etc. The smart device 130 may also be devices such as drones, unmanned vehicles, etc. The management device 110 is a device for managing the smart device. The management device 110 can communicate with the user equipment and the smart device. The management device 110 implements functions such as permission management, assisted control, etc. A specific implementation of the management device may include but is not limited to: implementations such as smart routers, network hosts, single network server, a set of multiple network servers, or a set of cloud computing-based computers, etc. Here, the cloud is composed of a massive number of hosts or network servers based on Cloud Computing, wherein cloud computing is a type of distributed computing, which is a virtual computer composed of a group of loosely coupled computer sets.

Figure 2:
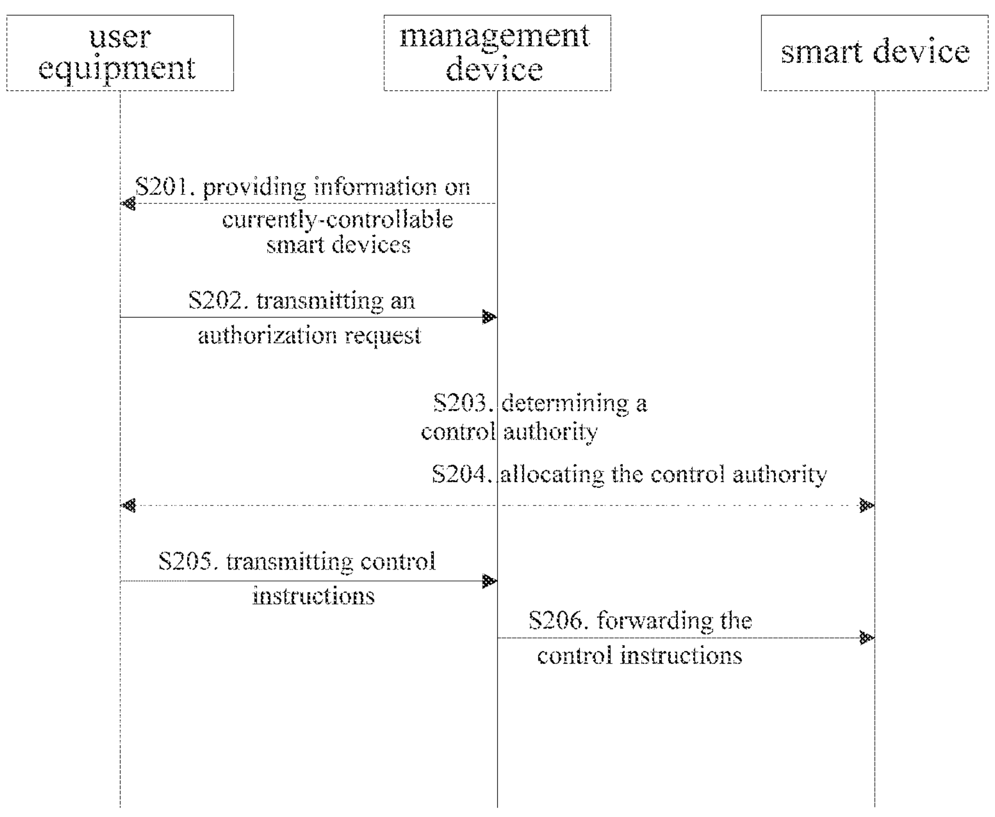
FIG. 2 is an interaction flowchart in implementing a method for controlling a smart device according to embodiments of the present application.

FIG. 2 shows an interaction flow among the user equipment 120, the management device 110, and the smart device 130 in implementing a method for controlling a smart device according to some embodiments of the present application. The interaction flow comprises the following steps:

step S201, the management device provides a user equipment with information on currently-controllable smart devices, so that the user equipment transmits an authorization request for a target smart device based on the information on the currently-controllable smart devices. The information on the currently-controllable smart devices refers to information on smart devices which may be controlled by user equipments, for example, in form of a list. The content of the list may comprise identification information which can identify the smart devices, such as device number, name, description information, etc., of the smart devices. When a new smart device is accessed, the management device may obtain registration information of the recently accessed smart device, and then update the information on the currently-controllable smart devices according to the registration information to ensure that the user equipment is able to obtain the latest information.

In addition, current state of control of the smart devices may also be included. For example, smart device A has been controlled by user equipment u1, which may provide a reference for a user to select a target smart device to avoid authority conflict and thus improve user experience. For example, there are multiple smart devices of the same kind, referred to as smart devices A1, A2, and A3 respectively. If smart device A1 has already been controlled by user equipment u1, then user equipment u2 may choose to obtain the control authority of smart device A2 or A3.

In some embodiments of the present application, the management device may actively provide the user equipment with information on currently-controllable smart devices, or may provide such information based on a request from the user equipment. That is, the management device returns the information on the currently-controllable smart devices to the user equipment according to a query request from the user equipment when obtaining the query request. Alternatively, the management device may also detect devices accessed in a network to which the management device is connected and transmit the information on the currently-controllable smart devices to the user equipment upon detecting that the user equipment has accessed the network. In an actual scenario, the network is constructed based on various modes such as WIFI, Zigbee, Bluetooth, or cellular data, etc.

The interaction flow comprises: step S202, the user equipment obtains the information on the currently-controllable smart devices provided by the management device, and transmits the authorization request for the target smart device to the management device based on the information on the currently-controllable smart devices. In an actual scenario, the user equipment may display the information on the currently-controllable smart devices to a user when receiving the information. The user selects a target smart device which he/she wants to control, according to obtained information. For example, the information on the currently-controllable smart devices comprises four controllable smart devices A to D. If smart devices C and D out of the four devices have been controlled by other users, then the user may select smart device A out of the four devices as the target smart device, so that the user equipment transmits an authorization request for the target smart device to the management device.

The interaction flow comprises: step S203, the management device obtains the authorization request for the target smart device from the user equipment, and determines a control authority of the target smart device for the user equipment according to request parameters in the authorization request.

The request parameters may be any information carried in the authorization request which can affect specific contents of control authority. For example, the request parameters may be information on a user identity, wherein an administrator identity can obtain a maximum control authority, a registered user can obtain a medium control authority, and an unregistered user can only obtain a minimum control authority. Taking control authority of an air conditioner as an example, contents of control authority may comprise control of on & off, adjustment of operating modes, adjustment of temperatures, adjustment of wind directions, adjustment of air volume, etc. The maximum control authority may comprise all of the above contents of control, that is, a user equipment with the maximum control authority can perform all of the above operations at arbitrary. The medium control authority may comprise adjustment of operating modes, adjustment of temperatures, adjustment of wind directions, adjustment of air volume, but may not comprise control of on & off of the air conditioner. The minimum control authority may only comprise adjustment of temperatures, adjustment of wind directions and adjustment of air volume.

In some embodiments of the present application, an authority level for the user equipment may be determined according to the request parameters in the authorization request. Then the control authority of the target smart device for the user equipment is determined according to the authority level for the user equipment. For example, authority levels may be preset such as a first-level authority, a second-level authority and a third-level authority. For different types of smart devices, each of the authority levels corresponds to different specific contents of control authority. Taking the above-mentioned air conditioner as an example, the third-level authority corresponds to the maximum control authority, the second-level authority corresponds to the medium control authority, and the first-level authority corresponds to the minimum control authority. For other smart devices, due to actual content of control authority, actual contents corresponding to each of the authority levels are different. For example, for smart sounds, control authority corresponding to the first-level authority may be adjustment of volume, control authority corresponding to the second-level authority may be adjustment of volume and control of playing, and control authority corresponding to the three-level authority may be adjustment of volume, control of playing, adjustment of sound effect and control of on & off.

Thus, authorities with different extents of permissions may be uniformly pre-divided for each type of smart devices by setting the authority levels so that the request parameters is associated with specific contents of control authority based on a standard association value, which facilitates standardization of permissions allocation, and avoids inappropriate permissions allocation results generated due to lack of a uniform standard.

In other embodiments of the present application, the management device may set a valid duration of the control authority. For example, the valid duration of control authority of smart device A for user equipment u1 is 2 hours. After two hours, user equipment u1 would automatically lose the control authority to smart device A. In an actual scenario, the valid duration may be related to the request parameters. Alternatively, the valid duration of a corresponding control authority may be determined according to the authority level for the user equipment. For example, the higher the authority level is, the longer the valid duration of the corresponding control authority is. As a result, management of control authorities may be more refined and flexible.

In an actual scenario, various types of applications may be installed and run on a user equipment. Some information in these applications can reflect some information of a user in specific scenarios. As a result, the control authority may be determined in association with these applications, and more personalized allocation of control authority may be provided to different users with some information in these applications. In some embodiments of the present application, the request parameters comprise a degree of association between the user equipment and the associated application. As a result, the degree of association information may be referred to when the control authority of the target smart device for the user equipment is determined. For example, the degree of association may be information about whether a user installs, registers, or authenticates certain application app1. If the user only installed application app1 on the user equipment, then the degree of association is considered to be lower, and the corresponding authority level is a first-level authority; if the user not only installed application app1, but also registered an account, the degree of association is considered to be relatively higher, and the corresponding authority level is a second-level authority; and if the user not only installed the app app1, registered an account, and used a mobile phone number to authenticate the account, the degree of association is considered to be the highest, and the corresponding authority level is a three-level authority.

The interaction flow comprises: step S204, the management device allocates control authority of the target smart device to the user equipment. After control authority are allocated, the user equipment must control the target smart device within the control authority. The specific method for allocating the control authority may be adjusted adaptively according to actual control mode, as long as it ensures that the user equipment is able to control the target smart device within the control authority. For example, the user equipment is notified of specific contents of control authority, so that the user equipment can only generate control instructions within the control authority when generating the control instructions. Alternatively, the target smart device may be notified at the same time when the user equipment is notified, so that the target smart device executes specific control instructions only when it receives these control instructions from a specific user equipment. The target smart device would not respond to control instructions if the control instructions come from other user equipments or if the control instructions exceed the range of the allocated control authority. In addition, if the user equipment realizes control of the smart device by forwarding control instructions via the management device, the control instructions that are not within the control permission may be filtered when the control instructions are forwarded.

If the information on the currently-controllable smart devices comprises a current state of control in addition to identification information of the smart devices, then after the user equipment is allocated the control authority of the target smart device, the current state of control in the information on the currently-controllable smart devices may be updated according to the allocated control authority, so that the user can instantly learn the current state of control of the smart devices.

The user equipment may control the target smart device within the control authority through two methods. One of the methods is that the user equipment directly communicates with the target smart device, and the other method is that the user equipment indirectly communicates with the target smart device through the management device.

The processing flow for the first method is shown in FIG. 2.

At step S205, the user equipment transmits control instructions within the control authority to the management device.

At step S206, the management device obtains the control instructions within the control authority from the user equipment, and forwards the control instructions to the target smart device.

Figure 3:
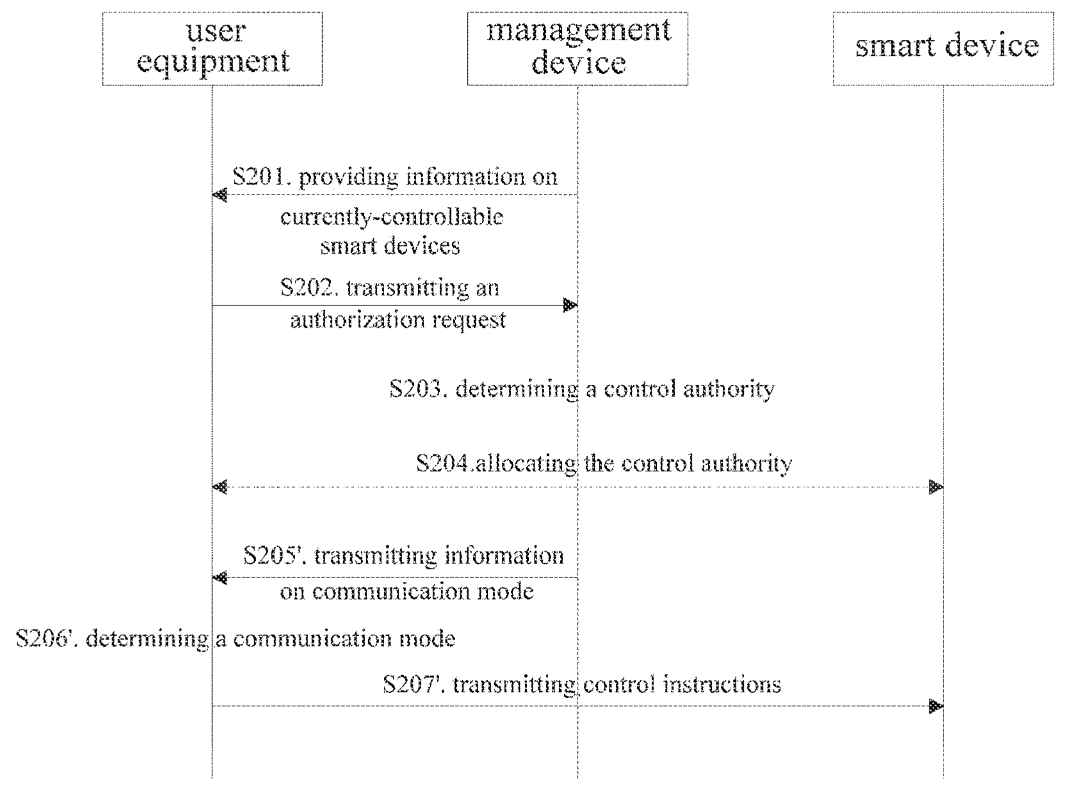
FIG. 3 is another interaction flowchart in implementing a method for controlling a smart device according to embodiments of the present application.

The processing flow for the second method is shown in FIG. 3.

At step S205', the management device transmits information on communication mode of the target smart device to the user equipment. The information on communication mode is used to enable the user equipment to learn communication modes applicable to the target smart device such as communication protocols, communication ports, and control instruction forms employed by the target smart device, and thereby communication between the user equipment and the target smart device is achieved.

At step S206', the user equipment obtains information on communication mode of the target smart device from the management device, and determines a communication mode with the target smart device according to the information on communication mode.

At step S207', the user equipment transmits control instructions within the control authority to the target smart device through the communication mode.

After the target smart device obtained the control instructions within the control authority, it may execute corresponding control instructions to realize corresponding functions. Regarding whether the control instructions have been successfully executed, the target smart device may also feed execution results back to the user equipment through the management device or directly, so that the user can instantly learn whether the control instructions have been executed successfully, and thereby user experience is improved.

Figure 4:
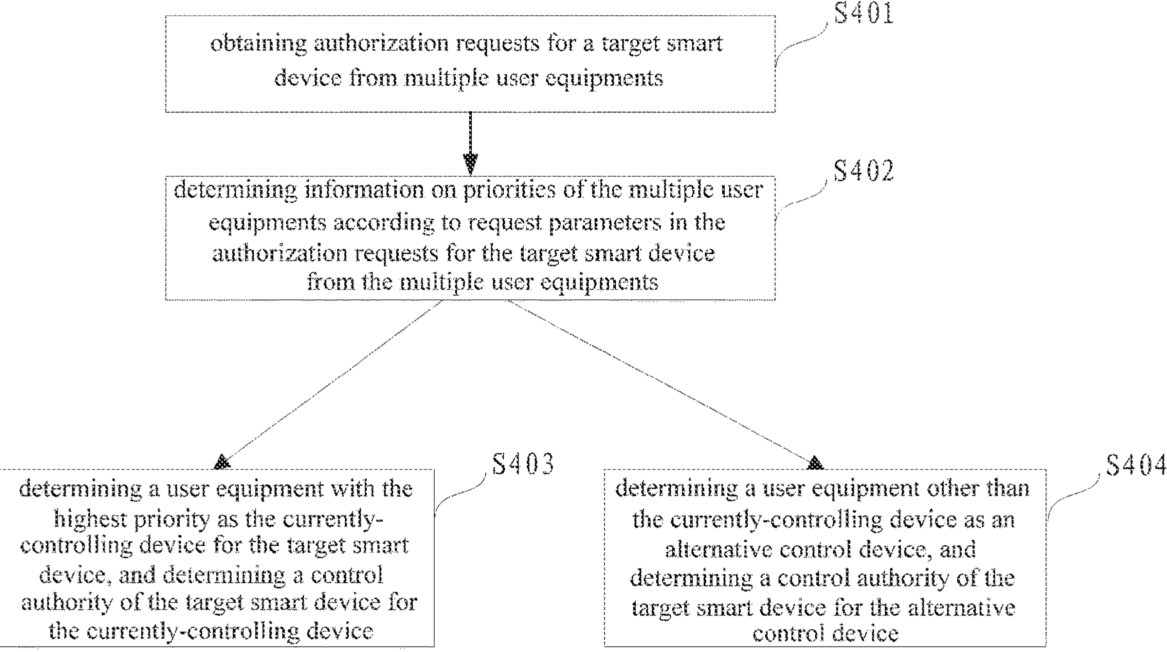
FIG. 4 is a processing flowchart for determining a control authority when multiple authorization requests are received at the same time in embodiments of the present application.

In an actual scenario, especially in open scenarios such as shopping malls, hotels, etc., it is possible that the management device receives authorization requests for the same target smart device from multiple user equipments at the same time due to the large number of users. Therefore, it is necessary to determine which user equipment wins the control authority first, while other user equipments need to wait based on actual situations. FIG. 4 shows a processing flowchart of the management device in this scenario. The processing flowchart comprises the following steps:

step S401, authorization requests for a target smart device from multiple user equipments are obtained;

step S402, information on priorities of the multiple user equipments is determined according to request parameters in the authorization requests for the target smart device from the multiple user equipments;

step S403, a user equipment with the highest priority is determined as the currently-controlling device for the target smart device, and a control authority of the target smart device for the currently-controlling device is determined;

step S404, a user equipment other than the currently-controlling device is determined as an alternative control device, and a control authority of the target smart device for the alternative control device is determined.

When the control authority for the currently-controlling device is withdrawn, the alternative control device is determined as a new currently-controlling device by the management device according to the information on priority. For example, there are four user equipments u1 to u4 which transmitted an authorization request for smart device A at the same time or in a short time period. Then based on the request parameters in the respective authorization requests, the rank of priorities L1 to L4 corresponding to user equipments u1~u4 is determined as L1>L3>L2>L4. Thus, user equipment u1 would be determined as the currently-controlling device of smart device A, and the control authority for user equipment u1 is valid for the smart device A at the current moment. User equipments u2, u3 and u4 are alternative control devices, and control authorities for user equipments u2, u3 and u4 would only take effect when a corresponding one of them becomes a new currently-controlling device. For example, when the currently-controlling device u1 actively requests to cancel the control authority or loses the control authority according to certain preset rules (exceeding the valid duration of the control authority, taking no action of control in a long time, being offline for a long time, etc.), user equipment u3 with the highest priority out of user equipments u2, u3, u4 would become a new currently-controlling device.

Figure 5:
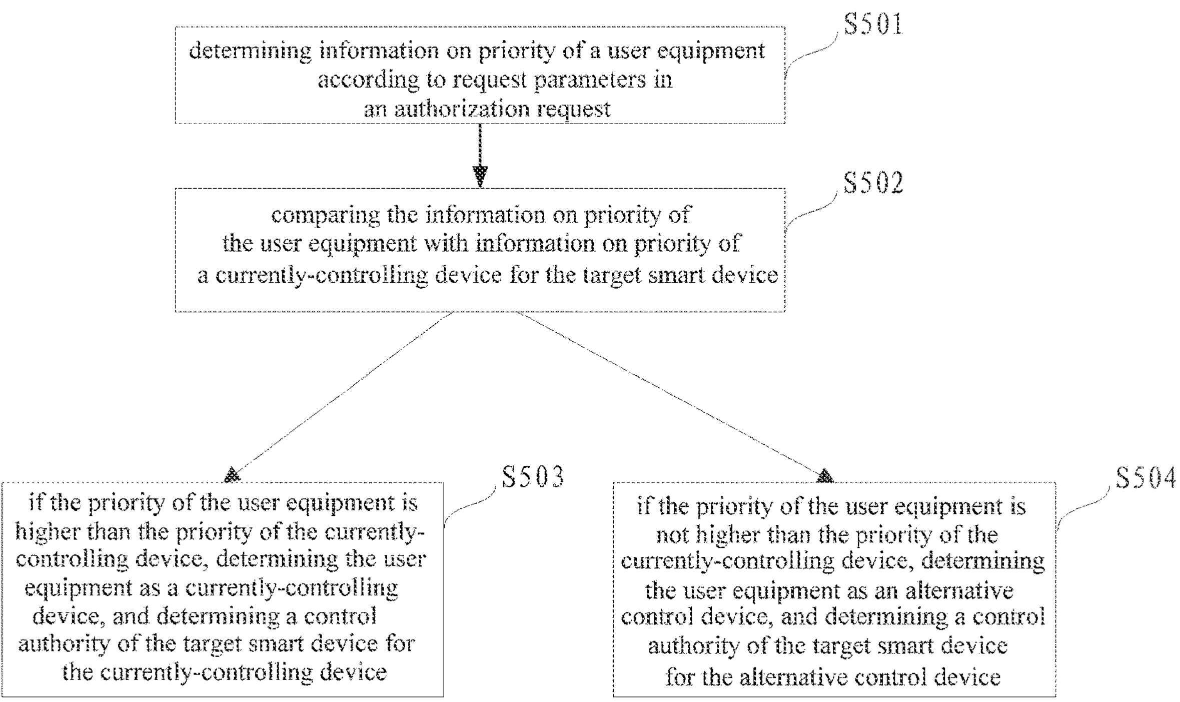
FIG. 5 is a processing flowchart for determining a control authority when a target smart device has been controlled in embodiments of the present application.

In addition, when a user wants to control a target smart device, the target smart device may already be under the control of another user equipment. At this time, the method shown in FIG. 5 may be utilized. The method comprises:

step S501, determining information on priority of a user equipment according to request parameters in an authorization request;

step S502, comparing the information on priority of the user equipment with information on priority of a currently-controlling device for the target smart device;

step S503, if the priority of the user equipment is higher than the priority of the currently-controlling device, determining the user equipment as the currently-controlling device, and determining a control authority of the target smart device for the currently-controlling device;

step S504, if the priority of the user equipment is not higher than the priority of the currently-controlling device, determining the user equipment as an alternative control device, and determining a control authority of the target smart device for the alternative control device. In an actual scenario, if multiple authorization requests are received at this time, the methods for processing in the above-mentioned scenarios may be combined. That is, information on priority corresponding to the multiple authorization requests are compared with information on priority of the currently-controlling device for the target smart device, and thus the ultimate currently-controlling device and alternative control devices are determined.

Summing up, in the solutions provided by some embodiments of the present application, the management device provides a user equipment with information on currently-controllable smart devices, so that a user can learn actual situation of the currently-controllable smart devices through the user equipment to determine a target smart device, and sends an authorization request for the target smart device through the user equipment. Then the management device determines a control authority of the target smart device for the user equipment according to request parameters in the authorization request, so as to provide customized allocation of a corresponding control authority of the target smart device to each user equipment, so that the user equipment can control the target smart device under the control authority. Thus control authorities for different user equipments is controlled flexibly, while an excessively broad control authority for a specific user equipment which affects security is avoided.

Figure 6:
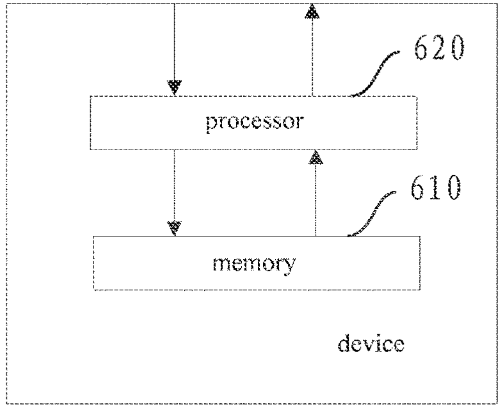
FIG. 6 is a schematic structural diagram of a device for controlling a smart device provided by embodiments of the present application.

In addition, a portion of the present application can be embodied as a computer program product, such as computer program instructions, when executed by a computer, can invoke or provide a method and/or technical solution in accordance with the present application. The program instructions for invoking the method of the present application may be stored in a fixed or removable storage medium, and/or from a data stream in a broadcast or other signal carrier medium, and/or stored in a working memory of the computer device in which the program instructions run. Herein, some embodiments in accordance with the present application includes a device as shown in FIG. 6, which includes one or more memories 610 storing computer-readable instructions and processor 620 for executing computer-readable instructions, wherein the computer-readable instructions, when executed by the processor, cause the device to perform the aforementioned methods and/or technical solutions based on various embodiments of the present application to realize the functions of the user equipment or the management device.

In addition, some embodiments of the present application also provides a computer-readable medium having computer program instructions stored thereon, the computer program instructions being executable by a processor to implement the aforementioned methods and/or technical solutions from various embodiments of the present application to realize the functions of the user equipment or the management device.

It should be noted that the present application can be implemented in software and/or a combination of software and hardware, for example, by using an application specific integrated circuit (ASIC), a general purpose computer, or any other similar hardware device. In some embodiment, the software program of the present application can be executed by a processor to implement the steps or functions described above. Likewise, the software programs (including related data structures) of the present application can be stored in a computer-readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

For those skilled in the art, it is apparent that the present application is not limited to the details of the above-mentioned exemplary embodiments, and the present application can be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method, implemented at a management device, for controlling a smart device, comprising:

providing a user equipment with information on currently-controllable smart devices, so that the user equipment transmits an authorization request for a target smart device based on the information on the currently-controllable smart devices;

obtaining the authorization request for the target smart device from the user equipment;

determining a control authority of the target smart device for the user equipment according to request parameters in the authorization request; and allocating the control authority of the target smart device to the user equipment, so that the user equipment controls the target smart device within the control authority, wherein the step of obtaining the authorization request for the target smart device from the user equipment comprising:

obtaining authorization requests for the target smart device from multiple user equipments; and wherein determining the control authority of the target smart device for the user equipment according to the request parameters in the authorization request comprising:

determining information on priorities of the multiple user equipments according to the request parameters in the authorization requests for the target smart device from the multiple user equipments; and determining a user equipment with a highest priority as the currently-controlling device for the target smart device, and determining a control authority of the target smart device for the currently-controlling device.

2. The method according to claim 1, wherein the step of providing the user equipment with the information on the currently-controllable smart devices comprising:

returning the information on the currently-controllable smart devices to the user equipment according to a query request from the user equipment when obtaining the query request; or transmitting the information on the currently-controllable smart devices to the user equipment upon detecting that the user equipment has accessed a network to which the management device is connected.

3. The method according to claim 1, wherein the method further comprising:

determining a user equipment other than the currently-controlling device as an alternative control device, and determining a control authority of the target smart device for the alternative control device, wherein the alternative control device is determined as a new currently-controlling device by the management device according to the information on priority when the control authority for the currently-controlling device is withdrawn.

4. The method according to claim 1, wherein the step of determining the control authority of the target smart device for the user equipment according to the request parameters in the authorization request comprising:

determining information on priority of the user equipment according to the request parameters in the authorization request;

comparing the information on priority of the user equipment with information on priority of a currently-controlling device for the target smart device;

if the priority of the user equipment is higher than the priority of the currently-controlling device, determining the user equipment as a new currently-controlling device, and determining a control authority of the target smart device for the new currently-controlling device; and if the priority of the user equipment is not higher than the priority of the currently-controlling device, determining the user equipment as an alternative control device, and determining a control authority of the target smart device for the alternative control device, wherein the alternative control device is determined as a new currently-controlling device by the management device according to the information on priority when the control authority for the currently-controlling device is withdrawn.

5. The method according to claim 1, wherein the step of determining the control authority on the target smart device for the user equipment according to the request parameters in the authorization request comprising:

determining an authority level for the user equipment according to the request parameters in the authorization request; and determining the control authority of the target smart device for the user equipment according to the authority level for the user equipment.

6. The method according to claim 5, wherein the method further comprising:

determining a valid duration of a corresponding control authority according to the authority level for the user equipment.

7. The method according to claim 5, wherein the request parameters comprise a degree of association between the user equipment and an associated application.

8. The method according to claim 1, wherein the method further comprising:

obtaining registration information of a recently accessed smart device; and updating the information on the currently-controllable smart devices according to the registration information.

9. The method according to claim 8, wherein the information on the currently-controllable smart devices comprises at least identification information and a current state of control of the smart devices;

after allocating the control authority of the target smart device to the user equipment, the method further comprising:

updating the current state of control in the information on the currently-controllable smart devices according to the allocated control authority.

10. The method according to claim 1, wherein the step of allocating the control authority of the target smart device to the user equipment, so that the user equipment controls the target smart device within the control authority comprising:

allocating the control authority of the target smart device to the user equipment;

obtaining control instructions from the user equipment which are within the control authority; and forwarding the control instructions to the target smart device.

11. The method according to claim 1, wherein the step of allocating the control authority of the target smart device to the user equipment, so that the user equipment controls the target smart device within the control authority comprising:

allocating the control authority of the target smart device to the user equipment; and transmitting information on communication mode of the target smart device to the user equipment, so that the user equipment determines a communication mode with the target smart device according to the information on communication mode and transmits control instructions within the control authority to the target smart device through the communication mode.

12. A device for controlling a smart device, the device including a memory for storing computer program instructions and a processor for executing computer program instructions, wherein the computer program instructions, when executed by the processor, trigger the device to perform the following operations:

providing a user equipment with information on currently-controllable smart devices, so that the user equipment transmits an authorization request for a target smart device based on the information on the currently-controllable smart devices;

obtaining the authorization request for the target smart device from the user equipment;

determining a control authority of the target smart device for the user equipment according to request parameters in the authorization request; and allocating the control authority of the target smart device to the user equipment, so that the user equipment controls the target smart device within the control authority, wherein obtaining the authorization request for the target smart device from the user equipment comprising:

obtaining authorization requests for the target smart device from multiple user equipments; and wherein determining the control authority of the target smart device for the user equipment according to the request parameters in the authorization request comprising:

determining information on priorities of the multiple user equipments according to the request parameters in the authorization requests for the target smart device from the multiple user equipments; and determining a user equipment with a highest priority as the currently-controlling device for the target smart device, and determining a control authority of the target smart device for the currently-controlling device.

* * * * *